United States Patent [19]

Stobbs et al.

[11] 4,400,588
[45] Aug. 23, 1983

[54] ELECTRONIC VOICE NETWORK FOR A TELEPHONE SUBSCRIBER'S SUBSTATION

[75] Inventors: William Stobbs, North Reading, Mass.; Charles Hines; Rickey W. Light, both of Huntsville, Ala.

[73] Assignees: GTE Automatic Electric Labs Inc.; GTE Labs Inc., both of Northlake, Ill.

[21] Appl. No.: 273,700

[22] Filed: Jun. 15, 1981

[51] Int. Cl.³ .................. H04M 1/00; H04M 1/76
[52] U.S. Cl. ........................... 179/81 R; 179/16 F
[58] Field of Search .............. 179/16 F, 81 A, 81 R

[56] References Cited

U.S. PATENT DOCUMENTS 3,789,155  1/1974  Fensom ..................... 179/81 A
4,143,247  3/1979  Yoshitoshi et al. ........ 179/16 F X
4,332,984  6/1982  Davis et al. ................ 179/81 R Primary Examiner—G. Z. Rubinson
Assistant Examiner—Keith E. George
Attorney, Agent, or Firm—Gregory G. Hendricks; Robert J. Black

[57] ABSTRACT

A circuit which performs loop supervision, transmit, receive, and transmit and receive regulation and sidetone balance. A loading circuit shunts excess current from the transmit and receive circuits under short loop conditions. The loading circuit also controls regulation of the transmit and receive circuits. Use of constant current power supplies external to the transmit and receive circuits prevents modulation of the power supplies.

8 Claims, 1 Drawing Figure

ELECTRONIC VOICE NETWORK FOR A TELEPHONE SUBSCRIBER'S SUBSTATION

BACKGROUND OF THE INVENTION (1) Field of the Invention

The present invention relates to telephone subscriber's substations and more particularly to a voice network circuit for use in telephone subscriber's substations.

(2) Description of the Prior Art

Traditional voice networks are of a passive circuit design, have wide transmit regulation characteristics and imprecise loop supervision characteristics. These circuits typically utilize physically cumbersome induction coils.

U.S. Pat. No. 3,823,273 issued on July 9, 1974, to R. H. Beeman, et al., is an example of a more recent electronic network. However, this circuit implements loop supervision with the transmit element, and bias for this network is supplied by a resistive network which requires low current circuit elements for proper operation.

Accordingly, it is the object of the present invention to provide a voice network with precise regulation and supervision characteristics and without the requirement of induction coils or low current circuit elements.

SUMMARY OF THE INVENTION

The present invention is a novel circuit for providing loop supervision, transmit, transmit regulation, receive and receive regulation, and side-tone balance in a telephone substation.

This circuit consists of a load circuit connected to transmit and receive circuits. The load circuit is also connected to the remainder of the telephone substation circuitry which includes the dialing and ringing circuits.

The load circuit operates a shunt excess current from the transmit and receive circuits when employed in a telephone substation connected to a telephone office via a short loop circuit. This load circuit also generates transmit and receive regulation control signals.

The transmit circuit includes a microphone shunted by a transmit regulation circuit which operates under control of the transmit regulation control signal from the load circuit. Similarly the receive circuit includes a receiver shunted by a receive regulation circuit which operates under control of the receive regulation control signal from the load circuit. The receive circuit also includes a sidetone circuit which operates to cancel the signal applied to the receiver when generated by the transmit circuit. This cancellation process reduces the side tone signal heard through the receiver when talking into the microphone.

DESCRIPTION OF THE DRAWINGS

The single FIGURE of the accompanying drawing is a schematic diagram of a voice network for a telephone substation in accordance with the present invention.

DESCRIPTION OF THE PREFERRED EMBODIMENT

Figure 1:
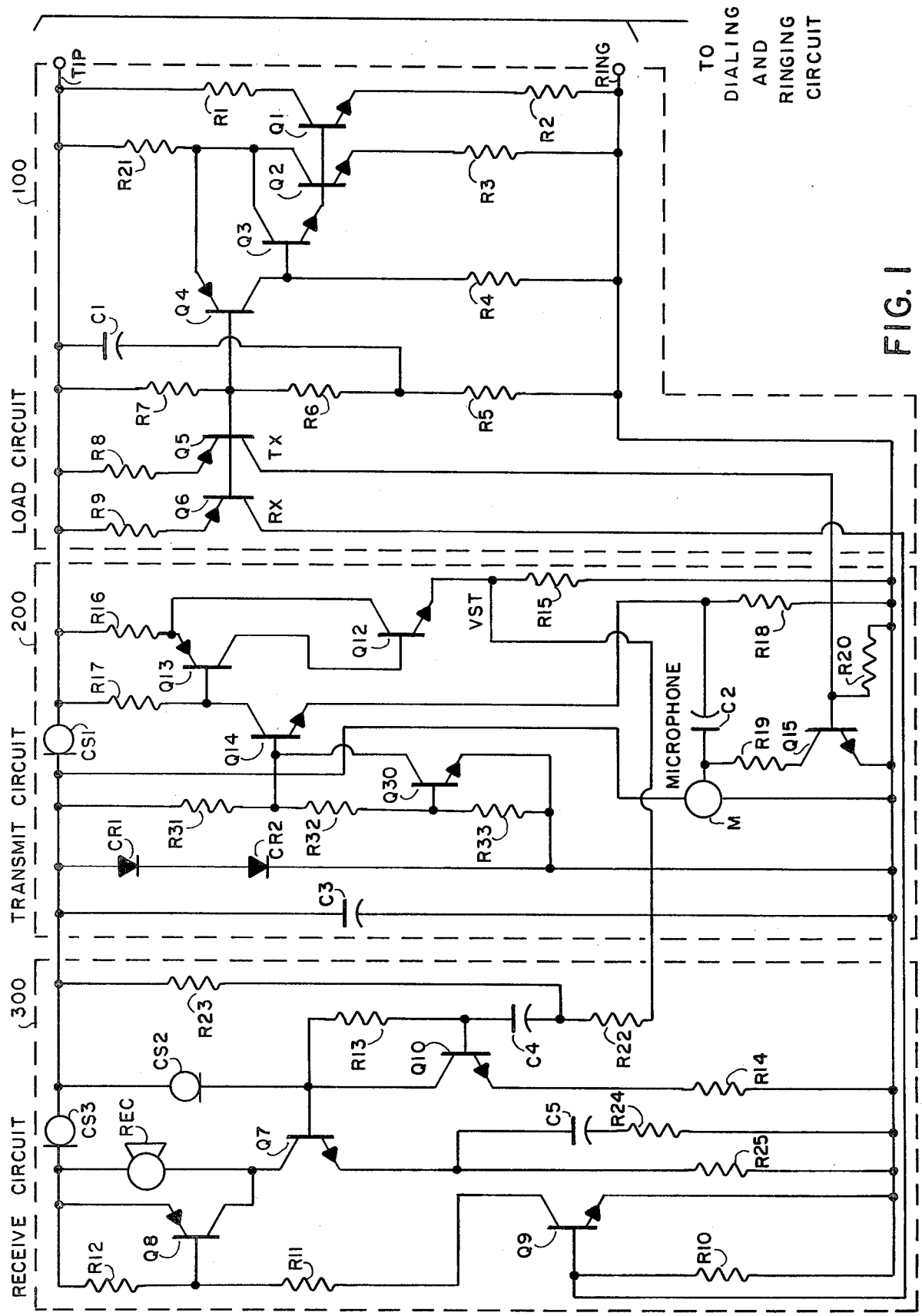

Referring now to the accompanying drawing, the electronic voice network of the present invention is shown.

Load circuit 100 is shown connected to the remainder of the telephone substation which includes the dialing and ringing circuits. Load circuit 100 operates to shunt excess current from the transmit and receive circuits when connected to the telephone office via short loops. In such situations sufficient voltage is developed across resistors R5, R6, and R7 to cause transistor Q4 to turn on. When Q4 turns on Darlington transistor pair Q2 and Q3 also turn on and provide base drive current to load transistor Q1 which operates to shunt excess current from the transmit and receive circuitry.

Under these short loop conditions, transmit regulation control transistor Q5 also turns on thereby generating a transmit regulation control signal. Similarly, under these short loop conditions, receive regulation control transistor Q6 also turns on thereby generating a receive regulation control signal.

Thus, load circuit 100 provides loop supervision by adjusting the resistance characteristics of the voice network through control of load transistor Q1. Also, since loop supervision is provided by the load circuit which is separate from the transmit and receive circuits the need for low current circuit elements has been eliminated.

Transmit circuit 200 is shown connected to load circuit 100. This circuit includes microphone M connected to transmit regulation control transistor Q5 via transmit regulation transistor Q15. Voice frequency signals from microphone M are applied to the tip and ring leads after being amplified by transistor Q14. However, under short loop conditions, transmit regulation transistor Q15, under control of transistor Q5, operates to shunt microphone M thereby reducing its output. Transistors Q12 and Q13 provide current gain to modulate the line with the transmit signal. Also a sidetone reference signal is provided at the emitter of Q12.

Receive circuit 300 is shown connected to transmit circuit 200. This circuit includes receiver element REC. Transistor Q7 operates to control the current through receiver REC thereby allowing receiver REC to convert voice frequency signals on the tip and ring leads to audible signals.

When the voice circuit is connected to the central office under short loop conditions, transistor Q6 generates a receive regulation control signal which causes transistor Q9 to turn on, thereby turning on receive regulation transistor Q8 which operates to shunt the current available to the receiver, thereby reducing its output under short loop conditions.

In order to reduce sidetone signals heard in the receiver, the phase shifted transmit signal from transistor Q12 is applied to the base of sidetone transistor Q10 via resistor R22. Since this signal is 180° out of phase with the signal applied to the base of transistor Q10, via resistor R23 there is no net signal at the base of Q10 if the ratio of R23 to R22 is appropriately adjusted. In this manner, the sidetone signal heard through receiver REC is reduced.

Current source CS1 is used to precisely control the current applied to microphone M thereby increasing the precision of operation of microphone M. Similarly current sources CS2 and CS3 provide for precise operation of receiver REC by controlling the current through the base and collector of receiver control transistor Q7. By isolating the transmit and receive circuits from the constant current power supplies, modulation of these power supplies is prevented, thereby increasing the precision of operation of the transmit and receive circuits. Current sources are old and well known and typically include a field effect transistor with its source connected to its gate via a resistor.

The precision of operation of the transmit circuit is further improved through use of a Vbe clamp circuit as a voltage reference for transistor Q14. This circuit includes resistors R31, R32, and R33 connected in parallel with diodes CR1 and CR2. Transistor Q30 is connected across resistors R32 and R33 and operates to provide a precise voltage reference for transistor Q14, thereby improving the transmission characteristics of microphone M and transmit circuit 200.

The electronic self compensating circuit of the present invention thus provides loop supervision and transmit and receive regulation without the use of induction coils or low current circuit elements.

It will be obvious to those skilled in the art that numerous modifications of the present invention can be made without departing from the spirit of the invention which shall be limited only by the scope of the claims appended hereto.

What is claimed is:

1. A voice network for a telephone subscriber's substation, connected to a telephone central office via a loop circuit, said central office operated to generate a bias signal and a first group of voice frequency signals of varying amplitude, said voice network comprising:

loading means connected to said loop circuit operated in response to predetermined levels of said bias signal to shunt corresponding predetermined portions of said bias signal;

transmit regulation means connected to said loop circuit and operated in response to predetermined levels of said bias signal to provide a transmit regulation control signal having corresponding predetermined levels of amplitude;

receive regulation means connected to said loop circuit and operated in response to predetermined levels of said bias signal to provide a receive regulation control signal having corresponding predetermined levels of amplitude;

transmitting means connected to said loop circuit and said transmit regulation means and operated to generate a second group of voice frequency signals of varying amplitude;

receiving means connected to said loop circuit and said receive regulation means and operated in response to said first group of voice frequency signals to generate audible signals of varying amplitude; and current control means operated to provide a constant current power supply for said transmitting and receiving means;

said transmitting means further operated in response to said transmit regulation control signal of predetermined levels of amplitude to attenuate the amplitude of said second group of voice frequency signals by corresponding predetermined amounts;

said receiving means further operated in response to said receive regulation control signal of predetermined levels of amplitude to attenuate the amplitude of said audible signals by corresponding predetermined amounts.

2. A voice network as claimed in claim 1, wherein: said transmitting means, comprise a microphone amplifier, said transmitting means further operated in response to said transmit regulation control signal to shunt corresponding predetermined portions of said second group of voice frequency signals from said microphone amplifier.

3. A voice network as claimed in claim 2, wherein: said transmitting means further comprise voltage clamping means operated to provide a voltage reference; and a microphone operated to generate electrical signals; said microphone amplifier connected to said microphone and said voltage reference means, operated in response to said electrical signals and said voltage reference to generate said second group of voice frequency signals.

4. A voice network as claimed in claim 1, wherein: said receiving means comprise a receiver, said receiving means operated in response to said receive regulation control signal to shunt corresponding predetermined portions of said first group of voice frequency signals from said receiver.

5. A voice network as claimed in claim 1, wherein: said transmitting means are further operated to generate a third group of voice frequency signals 180° out of phase with said second group of voice frequency signals.

6. A voice network as claimed in claim 5, wherein: said receiving means further comprise a side-tone circuit, operated in response to said third group of voice frequency signals to inhibit generation of said audible signals in response to said second group of voice frequency signals.

7. A voice network as claimed in claim 1, wherein: said current control means comprises a current source included in said transmitting means.

8. A voice network as claimed in claim 1, wherein: said current control means comprises a current source included in said receiving means.

* * * * *